(12) United States Patent
Li (10) Patent No.: US 11,871,464 B2
(45) Date of Patent: Jan. 9, 2024

(54) UNIFIED GRAPHICAL USER INTERFACE FOR DEVICES IN A WIRELESS NETWORK

(71) Applicant: ARRIS Enterprises LLC, Suwanee, GA (US)

(72) Inventor: Ju Li, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 393 days.

(21) Appl. No.: 17/312,566

(22) PCT Filed: Aug. 26, 2020

(86) PCT No.: PCT/CN2020/111354
§ 371 (c)(1),
(2) Date: Jun. 10, 2021

(87) PCT Pub. No.: WO2022/040976
PCT Pub. Date: Mar. 3, 2022

(65) Prior Publication Data
US 2022/0322471 A1     Oct. 6, 2022

(51) Int. Cl.
*H04W 76/15* (2018.01)
*H04W 88/08* (2009.01)

(52) U.S. Cl.
CPC ............ *H04W 76/15* (2018.02); *H04W 88/08* (2013.01)

(58) Field of Classification Search
None
See application file for complete search history.

(56) References Cited

U.S. PATENT DOCUMENTS

| | | | |
|---|---|---|---|
| 8,131,209 B1 * | 3/2012 | Chen | H04W 8/005 455/24 |
| 11,032,862 B2 * | 6/2021 | Kang | H04W 76/15 |
| 2005/0160160 A1 | 7/2005 | Wang | |
| 2013/0103855 A1 * | 4/2013 | Wang | H04L 61/5014 709/245 |
| 2016/0134469 A1 * | 5/2016 | Carter | H04W 12/04 370/254 |
| 2019/0378215 A1 | 12/2019 | Yelovitch et al. | |

FOREIGN PATENT DOCUMENTS

| | | |
|---|---|---|
| CN | 1638358 | 7/2005 |
| CN | 107329707 | 11/2017 |
| CN | 110678833 | 1/2020 |

OTHER PUBLICATIONS

International Search Report and the Written Opinion of the International Searching Authority dated May 25, 2021 in International (PCT) Application No. PCT/CN2020/111354.

* cited by examiner

*Primary Examiner* — Brian S Roberts
(74) *Attorney, Agent, or Firm* — Wenderoth, Lind & Ponack, L.L.P.

(57) ABSTRACT

An apparatus, method, and computer-readable recording medium provide a unified graphical user interface (GUI) to access devices in a wireless network according to an embodiment of the present disclosure is disclosed.

20 Claims, 5 Drawing Sheets

UNIFIED GRAPHICAL USER INTERFACE FOR DEVICES IN A WIRELESS NETWORK

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol generally includes the use of a MAP control device for the control and management of devices in the wireless network to improve the quality of experience (QoE) for users. Additionally, there have been advances in the connecting, onboarding, and configuring of these wireless devices within a wireless network.

Accessing each of the network devices, however, may present users with difficulty as each of these network devices possesses their own local network address for a graphical user interface (GUI) that users may use to obtain information and possibly configure the network devices. Users, who may access these devices using web browsers running on client devices, typically do not know the local network addresses for the network devices and their respective GUIs. Typically, a user may address a access point device having a network controller at a fix, well-known local network address. Effort is typically required to discover the addresses of the remaining network devices as well as their respective GUIs.

Thus, it would be advantageous and an improvement over the relevant technology to provide a unified graphical user interface (GUI) to access all of the network devices in a wireless network from a single location on the wireless network.

SUMMARY

An aspect of the present disclosure provides an access point device for a unified graphical user interface (GUI) to access devices in a wireless network. The wireless network is configured to communicatively interconnect the access point device, one or more extender access point devices, and one or more client devices. In this aspect of the present disclosure, the access point device includes a network controller, a non-transitory memory storing a program, and a communication interface configured to establish communication connections with one or more client devices and one or more extender access point devices via the wireless network.

The network controller is configured to execute the program to receive a request from a client device to access a network device, to retrieve a GUI address for one or more extender access point devices, to complete the unified GUI containing all of the GUI addresses, and to transmit the unified GUI to the client device.

An aspect of the present disclosure provides a method for providing a unified GUI to access devices in a wireless network. The wireless network is configured to communicatively interconnect an access point device, one or more extender access points, and one or more client devices. The method includes the network controller: receiving a request from a client device to access a network device, retrieving a GUI address for one or more extender access point devices, completing the unified GUI containing all of the GUI addresses, and transmitting the unified GUI to the client device.

An aspect of the present disclosure provides a non-transitory computer-readable recording medium in a access point device for providing a unified GUI to access devices in a wireless network—the wireless network configured to communicatively interconnect the access point device, one or more extender access point devices, and one or more client devices—the non-transitory computer-readable recording medium storing one or more programs which, when executed by a network controller of the access point device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustrative purposes only, and not for the purpose of limiting the present disclosure as defined by the appended claims and their equivalents.

Figure 1:
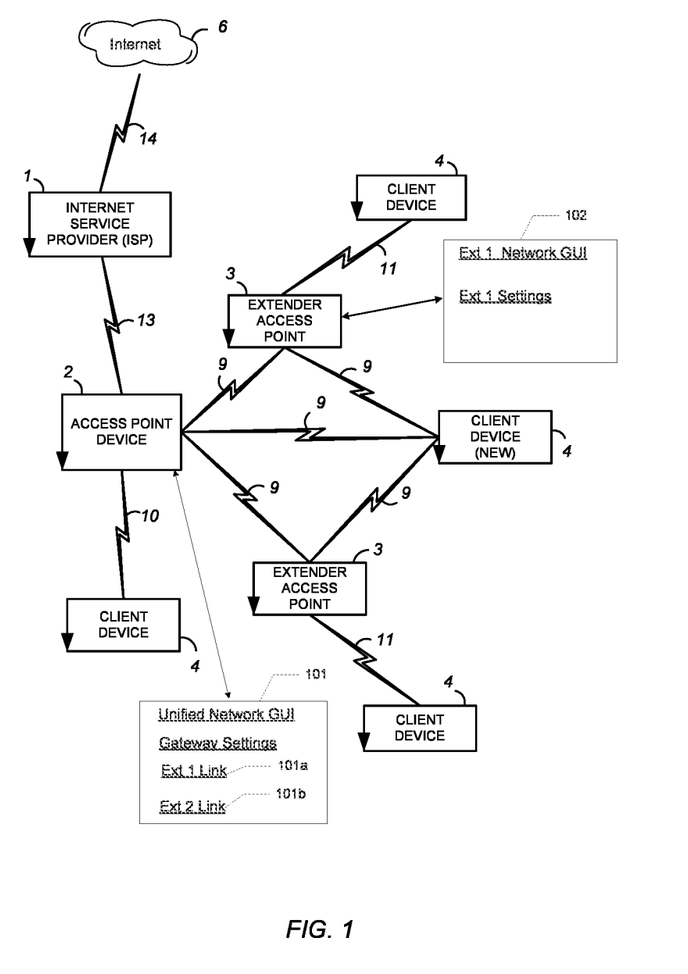
FIG. 1 is a schematic diagram of a system according to an embodiment of the present disclosure.

FIG. 1 is a schematic diagram of a system according to an embodiment of the present disclosure. As shown in FIG. 1, the main elements of the system include a access point device 2 connected to the Internet 6 via an Internet Service Provider (ISP) 1 and also connected to different wireless devices such as wireless extender access point devices 3 and client devices 4. The system shown in FIG. 1 includes wireless devices (e.g., extender access point devices 3 and client devices 4) that may be connected in one or more wireless networks (e.g., private, guest, iControl, Internet of Things (IoT) or backhaul network) within the system. Additionally, there could be some overlap between wireless devices (e.g., extender access point devices 3 and client devices 4) in the different networks. That is, one or more network devices could be located in more than one network. For example, the extender access point devices 3 could be located both in a private network for providing content and information to a client device 4 and also included in a backhaul network or an iControl network.

Starting from the top of FIG. 1, the ISP 1 can be, for example, a streaming video provider or any computer for connecting the access point device 2 to the Internet 6. The connection 14 between the Internet 6 and the ISP 1 and the connection 13 between the ISP 1 and the access point device 2 can be implemented, for example, using a wide area network (WAN), a virtual private network (VPN), a metropolitan area networks (MANs), a system area networks (SANs), a DOCSIS network, a fiber optics network (e.g., FTTH (fiber to the home) or a FTTX (fiber to the x), or a hybrid fiber-coaxial (HFC)), a digital subscriber line (DSL), a public switched data network (PSDN), a global Telex network, or a 2G, 3G, 4G or 5G network.

The connection 13 can further include as some portion thereof a broadband mobile phone network connection, an optical network connection, or other similar connections. For example, the connection 13 can also be implemented using a fixed wireless connection that operates in accordance with, but is not limited to, a 3rd Generation Partnership Project (3GPP), a Long Term Evolution (LTE) or a 5G protocols.

The access point device 2 can be, for example, a hardware electronic device that may be a combination modem and access point device that combines the functions of a modem, an access point, and/or a router for providing content received from the content provider 1 to network devices (e.g., extender access point devices 3 and client devices 4) in the system. It is also contemplated by the present disclosure that the access point device 2 can include the function of, but is not limited to, an Internet Protocol/Quadrature Amplitude Modulator (IP/QAM) a set-top box (STB) or a smart media device (SMD) that is capable of decoding audio/video content, and playing over-the-top (OTT) or multiple system operator (MSO) provided content.

The access point device 2 may possess a GUI 101 that is provided to client devices 4 upon submission of a request. The GUI 101 may be accessed using a web browser or a mobile application on the client devices 4 to obtain one or more web pages containing information regarding the access point device 2 and the wireless network under its control. This information may include an SSID for the wireless network, identities of all network extender access point devices that are part of the wireless network, and the status of these network devices. The web page may also include data fields and page controls permitting a user of the client devices to login to the access point device 2 in order to configure and modify the operation of the access point device 2 and the wireless network. One example embodiment of a unified GUI 101 for a access point device 2 is provided in additional detail in reference to FIG. 3a herein.

The GUI 101 of the access point device 2 also provides a hyperlink 101a-b that provides a local web address to the client devices 4 to directly access a GUI web page 102 available from each extender access point device 3 on the wireless network. The users of the client devices 4 may use the extender access point device GUI 102 to access, using the web browser or a mobile application on the client devices 4, one or more web pages containing information regarding the extender access point device 3 and the wireless network under its control. This information may include an SSID for the wireless network, current settings of the extender access point device 3, and the status of the extender access point device. The web page may also include data fields and page controls permitting a user of a client device to login to the extender access point device 3 in order to configure and modify the operation of the extender access point device 3 and the wireless network. One example embodiment of a GUI 102 for an extender access point device 3 is provided in additional detail in reference to FIG. 3b herein.

The connection 9 between the access point device 2, the extender access point devices 3, and client devices 4 can be implemented using a wireless connection in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extender access point devices 3 can be, for example, hardware electronic devices such as access points used to extend the wireless network by receiving the signals transmitted by the access point device 2 and rebroadcasting the signals to, for example, client devices 4, which may be out of range of the access point device 2. The wireless extender access point devices 3 can also receive signals from the client devices 4 and rebroadcast the signals to the access point device 2, or other client devices 4.

The connection 11 between the wireless extender access point devices 3 and the client devices 4 are implemented through a wireless connection that operates in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the CBRS band, 2.4 GHz bands, 5 GHz bands or 6 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities to connect to the Internet, cellular networks, and other devices via Wi-Fi and Bluetooth, or other wireless hand-held consumer electronic devices capable of executing and displaying content received through the access point device 2. Additionally, the client devices 4 can be a TV, an IP/QAM STB or an SMD that is capable of decoding audio/video content, and playing OTT- or MSO-provided content received through the access point device 2.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 also can be implemented, for example, through a WAN, LAN, VPN, MANs, PANs, WLANs, SANs, DOCSIS network, fiber optics network (e.g., FTTH, FTTX, or HFC), PSDN, global Telex network or 2G, 3G, 4G or 5G network.

The connection 10 also can be implemented using a wireless connection in accordance with Bluetooth protocols, Bluetooth Low Energy (BLE) protocols, or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
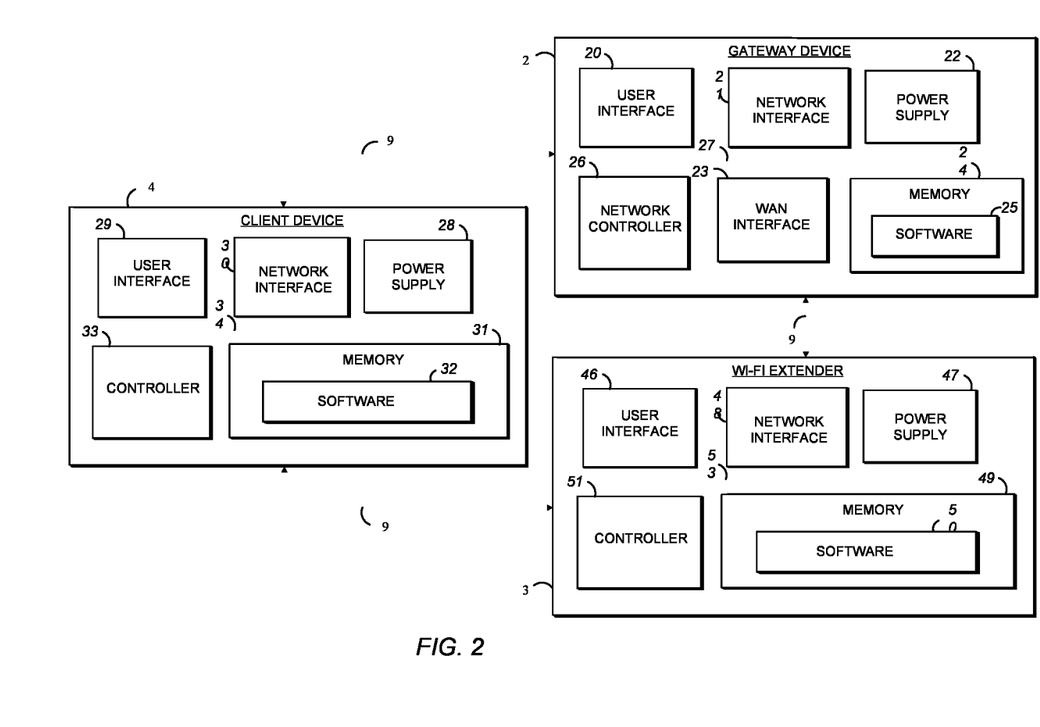
FIG. 2 is a more detailed schematic diagram of an exemplary access point device, client device, and extender access point devices implemented in the system of FIG. 1 according to an embodiment of the present disclosure.

A detailed description of the exemplary internal components of the access point device 2, the wireless extender access point devices 3, and the client devices 4 shown in FIG. 1 will be provided in the discussion of FIG. 2. However, in general, it is contemplated by the present disclosure that the access point device 2, the wireless extender access point devices 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the access point device 2, the wireless extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the wireless extender access point devices 3, and the client devices 4 are further equipped with components to facilitate communication with other computing devices over the one or more network connections to local and wide area networks, wireless and wired networks, public and private networks, and any other communication network enabling communication in the system.

It should be noted that while the embodiments discussed herein are directed to an access point device, the access point device may also include functionality of a both a modem and a router and may thus be considered a gateway device. The present invention is not intended to limit a type of access point devices considered to be part of the invention because of the use of these embodiments to describe the invention. The present invention should only be limited by limitations recited within the attached claims.

FIG. 2 is a more detailed schematic diagram of an exemplary access point device 2, an exemplary wireless extender access point device 3, and an exemplary client device 4 implemented in the system of FIG. 1 according to an embodiment of the present disclosure. Although FIG. 2 only shows one wireless extender access point device 3 and one client device 4, the wireless extender access point device 3 and the client device 4 shown in the figure are meant to be representative of the other wireless extender access point devices 3 and client devices 4 shown in FIG. 1. Similarly, the connections 9 between the access point device 2, the wireless extender access point device 3, and the client device 4 shown in FIG. 2 are meant to be exemplary connections and are not meant to indicate all possible connections between the access point devices 2, wireless extender access point devices 3, and client devices. Additionally, it is contemplated by the present disclosure that the number of access point devices 2, wireless extender access point devices 3, and client devices 4 is not limited to the number of access point devices 2, wireless extender access point devices 3, and client devices 4 shown in FIGS. 1 and 2.

Now referring to FIG. 2 (e.g., from left to right), the client device 4 can, for example, be a computer, portable device, electronic tablet, e-reader, PDA, smart phone, smart speaker, IoT device, iControl device, portable music player with smart capabilities to connect to the Internet, cellular networks, and other devices via Wi-Fi and Bluetooth, or other wireless hand-held consumer electronic devices capable of executing and displaying the content received through the access point device 2. Additionally, the client device 4 can be a TV, an IP/QAM STB, or an SMD that is capable of decoding audio/video content, and playing OTT- or MSO-provided content received through the access point device 2.

As shown in FIG. 2, the client device 4 includes a power supply 28, user interface 29, network interface 30, memory 31, and controller 33. The power supply 28 provides power to the internal components of the client device 4 through the internal bus 34. The power supply 28 can be a self-contained power source such as a battery pack with an interface powered through an electrical charger connected to an outlet (e.g., either directly or by way of another device). The power supply 28 also can include a rechargeable battery that can be detached to allow for replacement such as nickel-cadmium (NiCd), nickel metal hydride (NiMH), lithium-ion (Li-ion), or lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the access point device 2 and the wireless extender access point device 3 using the wireless protocols in accordance with connection 9 (e.g., as described with reference to FIG. 1).

The memory 31 includes a single memory or one or more memories or memory locations that include, but are not limited to, a: random access memory (RAM), dynamic random access memory (DRAM), memory buffer, hard drive, database, erasable programmable read only memory (EPROM), electrically erasable programmable read only memory (EEPROM), read only memory (ROM), flash memory, logic blocks of a field programmable gate array (FPGA), hard disk or any other various layers of memory hierarchy. The memory 31 can be used to store any type of instructions, software or algorithms for controlling the general function and operations of the client device 4 in accordance with the embodiments described in the present disclosure (e.g., including optimized onboarding according to the embodiments of the present disclosure).

The controller 33 controls the general operations of the client device 4 and includes, but is not limited to, a central processing unit (CPU), hardware microprocessor, hardware processor, multi-core processor, single-core processor, field programmable gate array (FPGA), microcontroller, application specific integrated circuit (ASIC), digital signal processor (DSP) or other similar processing device capable of executing any type of instructions, algorithms or software for controlling the operation and functions of the client device 4 in accordance with the embodiments described in the present disclosure. Communications between the components (e.g., 28-31 and 33) of the client device 4 may be established using an internal bus 34.

The wireless extender access point device 3 can be, for example, a hardware electronic device such as an access point used to extend a wireless network by receiving the signals transmitted by the access point device 2 and rebroadcasting the signals to client devices 4, which may be out of range of the access point device 2. The wireless extender access point device 3 can also receive signals from the client devices 4 and rebroadcast the signals to the access point device 2, mobile device 5 or other client devices 4.

As shown in FIG. 2, the wireless extender access point device 3 includes a user interface 46, power supply 47, network interface 48, memory 49, and controller 51. The user interface 46 can include, but is not limited to, push buttons, a keyboard, a keypad, an LCD, a TFT, an LED, an HD or other similar display device including a display device having touch screen capabilities to allow interaction between a user and the wireless extender access point device 3. The power supply 47 provides power to the internal components of the wireless extender access point device 3 through the internal bus 53. The power supply 47 can include a self-contained power source such as a battery pack with an interface powered through an electrical charger connected to an outlet (e.g., either directly or by way of another device). The power supply 47 also can include a rechargeable battery that can be detached to allow for replacement such as a NiCd, NiMH, Li-ion, or a Li-pol batteries.

The network interface 48 can include various network cards, interfaces, and circuitry implemented in software and/or hardware to enable communications with the client device 4 and the access point device 2 using the wireless protocols in accordance with connection 9 (e.g., as described with reference to FIG. 1). The memory 49 can include a single memory or one or more memories or memory locations that include, but are not limited to, a RAM, DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender access point device 3 in accordance with the embodiments described in the present disclosure (e.g., including optimized onboarding according to the embodiments of the present disclosure).

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the wireless extender access point device 3 may be established using the internal bus 53.

The access point device 2, for example, can be a hardware electronic device that can combine the functions of a modem, an access point, and/or a router for providing content received from a content provider 1 to network devices (e.g., wireless extender access point devices 3, client devices 4, and mobile device 5) in the system. It also is contemplated by the present disclosure that the access point device 2 can include the function of, but is not limited to, an IP/QAM STB or SMD that is capable of decoding audio/video content, and playing OTT- or MSO-provided content.

As shown in FIG. 2, the access point device 2 includes a user interface 20, network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the access point device 2. The network interface 21 may include various network cards, and circuitry implemented in software and/or hardware to enable communications with the wireless extender access point device 3 and client devices 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance with connection 10 (e.g., as described with reference to FIG. 1).

The power supply 22 provides power to the internal components of the access point device 2 through the internal bus 27. The power supply 22 can be a self-contained power source such as a battery pack with an interface powered through an electrical charger connected to an outlet (e.g., either directly or by way of another device). The power supply 22 also can include a rechargeable battery that can be detached to allow for replacement such as a NiCd, a NiMH, a Li-ion, or a Li-pol battery. The WAN interface 23 may include various network cards and circuitry implemented in software and/or hardware to enable communications between the access point device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the access point device 2 and performing management functions related to the other devices (wireless extender access point devices 3 and client devices 4) in the network in accordance with the embodiments described in the present disclosure (e.g., including optimized onboarding of a device according to the embodiments of the present disclosure).

The network controller 26 controls the general operations of the access point device 2 as well as performs management functions related to the other devices (wireless extender access point devices 3 and client devices 4) in the network. The network controller can include, but is not limited to, a CPU, a hardware microprocessor, a hardware processor, a multi-core processor, a single core processor, a FPGA, a microcontroller, an ASIC, a DSP or other similar processing device capable of executing any type of instructions, algorithms or software for controlling the operation and functions of the access point device 2 in accordance with the embodiments described in the present disclosure. Communications between the components (e.g., 20-22, 24, and 26) of the access point device 2 may be established using an internal bus 27.

Figure 3A:
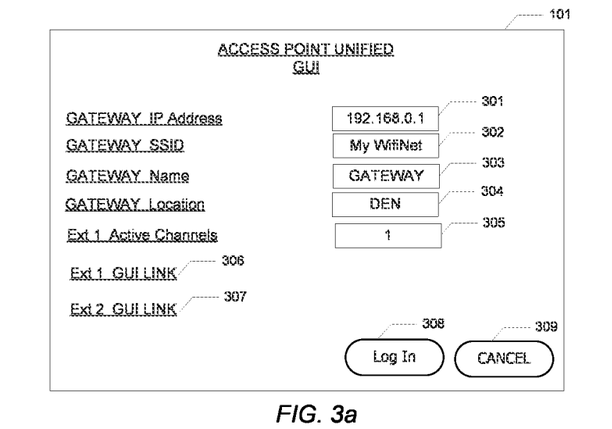
FIG. 3a illustrates an example unified GUI provided by an access point device in the system of FIG. 1 according to an embodiment of the present disclosure.

FIG. 3a illustrates an example unified GUI provided by a access point device in the system of FIG. 1 according to an embodiment of the present disclosure. As noted above, the GUI 101 of the access point device 2 presents a user of a client device 4 one or more web pages that provide useful information regarding the access point device. This information may include in part, an IP address for the access point 301, an SSID for the wireless network 302, a device name 303, a device location 304, and wireless network-related information 305 as desired. The access point device 2 GUI 101 also includes control buttons to log into the access point device 308 and to cancel and disconnect 309 the client device 4 from the access point GUI 101. Of course, other network status data and user controls may be provided as part of the access point GUI 101 that also may be presented using a plurality of separate web pages as needed to display all of the information and controls made available to the user of the client device 4.

The access point device 2 GUI 101 also includes one or more hyperlinks 306-307 that provide a direct link to a local web address to access the extender access point device 3 GUI for each extender access point device currently present on the wireless network. These hyperlinks 306-307 are dynamically created and included in the access point GUI 101 for each extender device currently active on the wireless network. When an extender access point device 3 is added or removed, the access point device 2 will add or remove a hyperlink for the extender access point device 3 as appropriate. An example embodiment of the extender access point device GUI 102 is disclosed in reference to FIG. 3b.

Figure 3B:
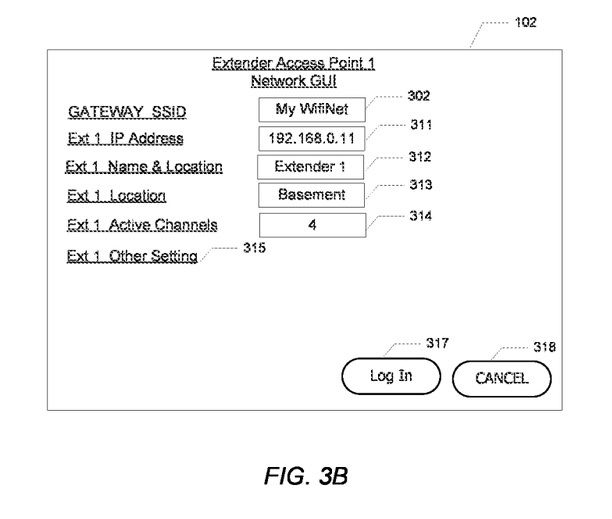
FIG. 3b illustrates an example unified GUI provided by an extender access point device in the system of FIG. 1 according to an embodiment of the present disclosure.

FIG. 3b illustrates an example unified GUI provided by an extender access point device in the system of FIG. 1 according to an embodiment of the present disclosure. As noted above, the GUI 102 of the extender access point device 3 presents the user of a client device 4 one or more web pages that provide useful information regarding the access point device. This information may include in part, an IP address for the access point 311, the SSID for the wireless network 302, a device name 312, a device location 313, and wireless network-related information 314-315 as desired.

The extender access point device 3 GUI 102 also includes control buttons to log into the access point device 317 and to cancel and disconnect 318 the client device 4 from the access point GUI 101. Of course, other network status data and user controls may be provided as part of the access point GUI 101 that may also be presented using a plurality of separate web pages as needed to display all of the information and controls made available to the user of the client device 4.

Figure 4:
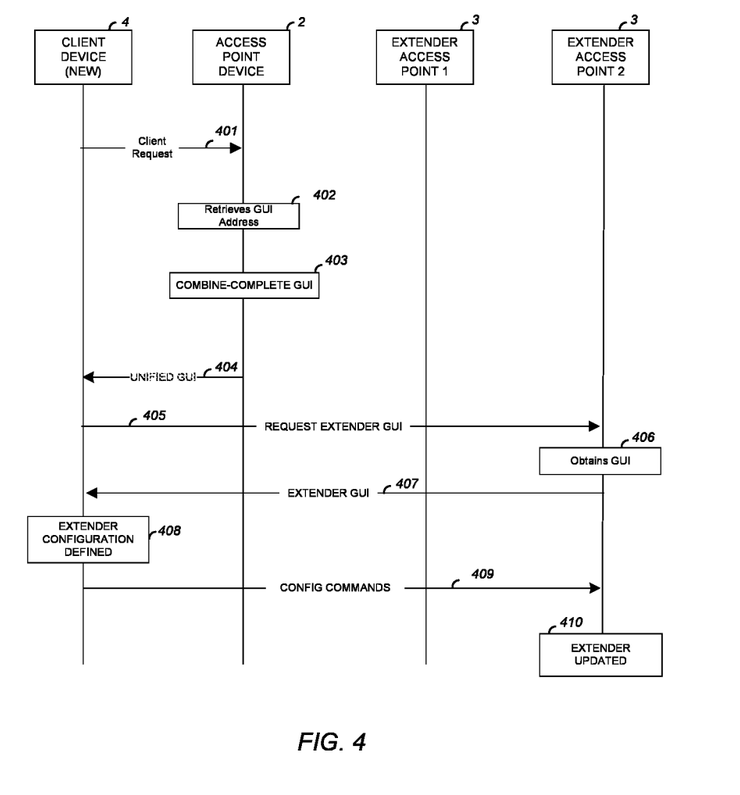
FIG. 4 illustrates a method and algorithm for providing a unified GUI to access devices in a wireless network according to an embodiment of the present disclosure.

FIG. 4 illustrates a method and algorithm for providing a unified GUI to access devices in a wireless network according to an embodiment of the present disclosure. In FIG. 4, it is assumed that the new client device (e.g., client device 4), the access point device 2, the Wi-Fi extender access point 1 (e.g., wireless extender access point 3), and Wi-Fi extender access point 2 (wireless extender access point 3) include their respective software 25, 32, 50 stored in their respective memories 24, 31, 49, which, when executed by their respective controllers 26, 33, 51, perform the functions and operations in accordance with the embodiments described in the present disclosure (e.g., including optimized onboarding of a device according to the embodiments of the present disclosure).

Although FIG. 4 shows one access point device 2, one client device 4 (e.g., new client device), and two wireless extender access point devices 3 (e.g., Wi-Fi extender access point 1 and Wi-Fi extender access point 2), it is contemplated by the present disclosure that the method and algorithm can be applied to any number of access point devices 2, client devices 4, and wireless extender access point devices 3 for providing optimized onboarding of devices to any number of wireless networks in the system of FIG. 1.

In step 401, the client device 4 sends a request for access to the access point device 2 to receive a copy of the access point GUI 101 of FIG. 3a. The client device 4 sends this request from a web browser or mobile application to a known local web address associated with the access point device 2. The access point device 2 provides this initial GUI 101 to all devices accessing this particular local web address.

The access point device 2 dynamically creates the access point GUI 101 to include all of the hyperlinks 306-307 for active extender access point devices as shown in FIG. 3a. The access point device 2 retrieves the extender access point local web GUI addresses for each active device in step 402 and adds these local web addresses to the access point GUI 101 to complete a unified GUI in step 403. The access point 2 typically maintains a table of active devices present on the wireless network at all times. An entry for each extender access point device 3 present on the wireless network may include its IP address. Using the IP addresses, the access point 2 may construct the extender access point GUI 102 addresses as the extender access point GUI 102 typically is located at a well-known address at the IP address of the extender access point device 3. The access point device 2 repeats this address construction for each extender access point device 3 currently on the wireless network.

In alternate embodiments, the access point device 2 may obtain the extender access point device 3 GUI 102 address from the extender access point device 3 and store the address into an entry for the extender access point device in the table of active devices. In this embodiment, the access point device 2 does not need to construct the GUI address as it will be known in the table entry. The access point device 2 typically obtains the GUI address from the extender access point device 3 at the time the extender access point device 3 connects to the wireless network. Of course, the access point device 2 and the extender access point devices 3 may periodically retransmit this data to ensure data in the table of active devices remain accurate. When the access point device 2 receives a disconnect message from the extender access point device 3, all of the entries associated with the particular extender access point device 3 may be purged from the table of active devices. When a access point 2 determines that an extender access point device 3 has unexpectedly become inactive, the entries associated with that particular extender access point device 3 also may be purged from the table of active devices.

In another alternate embodiment, the access point device 2 may request the extender access point GUI 102 address from each extender access point device 3 active on the wireless network each time a client device sends a request for the access point GUI 101. In this particular embodiment, the access point device 2 may verify that the particular extender access point device 3 is still active on the wireless network and has not changed its extender access point GUI 102 address. Other variants of these embodiments may be used such as periodically checking for the status and the GUI addresses of extender access point devices when a current entry in the table of active devices is older than a predetermined time value.

Once the access point device 2 has completed the addition of the hyperlinks to the extender access point GUI 102 addresses to the unified access point GUI 101, the access point device 2 sends the unified access point GUI 101 to the client device 4 in step 404. Using the hyperlinks in the unified access point GUI 101, users of the client devices 4 may send a request directly to a particular extender access point device 3 in step 405. In the example of FIG. 4, the client device 4 sends a request for the extender access point GUI 102 directly to extender access point device 2. Of course, the user may use the appropriate hyperlink to send a similar request to extender access point device 1 if desired.

The extender access point device 3 obtains its extender access point GUI 102 from its internal memory, populates any data values needed into the extender access point GUI 102 and returns the extender access point GUI to the client device in step 407. The user of the client device 4 may immediately view the initially-provided data in the extender access point GUI 102. The user also may log into the extender access point device if authorized to define any desired updates to settings of the extender access point device 3. Logging into the extender access point device, viewing additional data related to the extender access point device 3, and defining updates to settings of the extender access point device 3 may occur in step 408. While FIG. 4 illustrates this step as a single operation, the step may require additional exchanges of data between the client device 4 and the extender access point device 3 (not shown) that are not necessary for the operation of the present invention.

Once the user of the client device 4 has defined changes to the extender access point device 3, the client device 4 in step 409 transmits one or more configuration commands to the extender access point device 3. The extender access point device 3 implements the commanded changes to its settings in step 410 as instructed.

As noted above, although the communication using the hyperlinks was attempted on the Wi-Fi extender access point 2, a similar set of commands sent to the Wi-Fi extender access point 1 would follow a similar sequence of operations. The client device 4 may utilize the above process to communicate with any number of extender access point devices 3 present on the wireless network, and thus have a hyperlink included by the access point device within the unified access point GUI 101.

Figure 5:
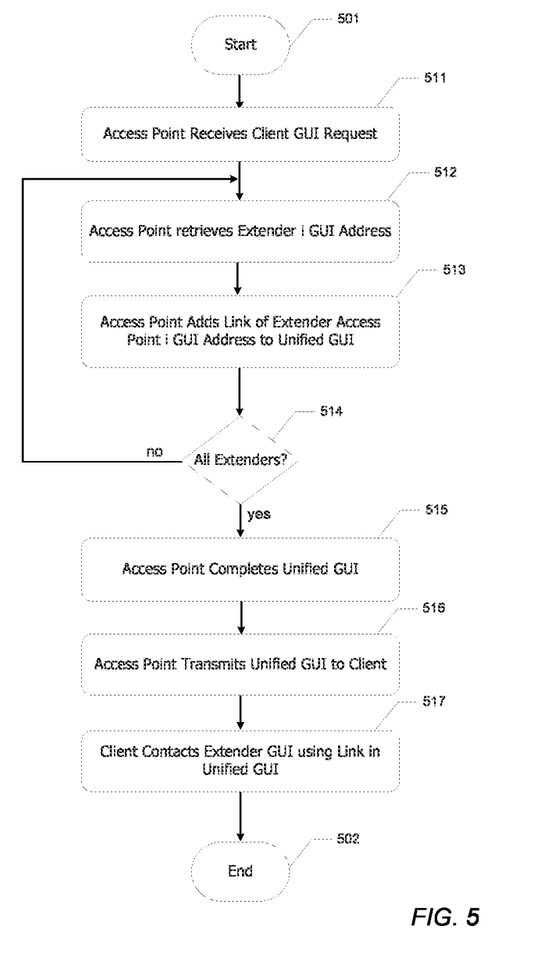
FIG. 5 illustrates a method and algorithm for providing a unified GUI to access devices in a wireless network according to an embodiment of the present disclosure.

FIG. 5 illustrates a method and algorithm for providing a unified GUI to access devices in a wireless network according to an embodiment of the present disclosure. The exemplary method and algorithm of FIG. 5 illustrate the action taken by the access point device 2 when a user requests a client device 4 to connect with the access point device 2.

In FIG. 5, it is assumed that the client devices 4, the access point device 2, and each of the wireless extender access point devices 3 include their respective software 25, 32, 50 stored in their respective memories 24, 31, 49, which when executed by their respective controllers 26, 33, 51 perform the functions and operations in accordance with the embodiments described in the present disclosure (e.g., including optimized onboarding of a device according to the embodiments of the present disclosure).

In step 511, the process begins 501 when the access point device 2 receives a request from a client device 4 to provide its access point GUI 101 allowing the client device 4 access to data related to the access point device 2 and its associated wireless network. The access point device 2 begins with a base definition of its access point GUI 101 that may be retrieved from its internal memory and populated with its data as disclosed above in reference to FIG. 3a.

The access point device 2, in step 512, retrieves an extender access point GUI address 102 associated with an extender access point device currently active on the wireless network so that, in step 513, the access point device 2 may add this address to a unified access point GUI 101. Test step 514 determines whether or not the access point device 2 has processed all of the extender access point devices 3 currently present on the wireless network and, if not, the process returns to step 512 to process the next extender access point device 3. When all of the extender access point devices have been processed, test step 514 passes the process to step 515 so that the access point device 2 may complete the unified access point GUI 101.

The access point device 2 transmits the unified access point GUI 101 to the client device 4 that sent the initial request in step 511. The client device 4 may then use the extender access point GUI addresses included as hyperlinks in the unified access point GUI 101 to directly contact a particular extender access point device 3 in step 517 before the process ends 502.

The present disclosure may be implemented as any combination of an apparatus, a system, an integrated circuit, and a computer program on a non-transitory computer-readable recording medium. The one or more processors may be implemented as an integrated circuit (IC), an application specific integrated circuit (ASIC) or as a large-scale integrated circuit (LSI), system LSI, super LSI, or ultra LSI component that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories stores software or algorithms with executable instructions and the one or more processors executes a set of instructions for associated software or algorithms to provide monitoring and installation enhancements in any number of wireless networks in accordance with the embodiments described in the present disclosure.

The software and computer programs, which also can be referred to as programs, software applications, applications, components or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory or programmable logic device (PLD), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above also are included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute or add various procedures or components as appropriate. For instance, features described with respect to certain embodiments may be combined in other embodiments.

I claim:

1. An access point device for use with an extender access point device, and a client device, the access point device comprising:
   a memory having instructions stored thereon; and
   a processor configured to execute the instructions on the memory to cause the access point device to perform operations comprising:
   receiving a configuration request from the client device;
   retrieving, based on the configuration request, a GUI address of the extender access point device;
   adding the GUI address to a unified network GUI as a hyperlink, the unified network GUI being a GUI for the access point device and the extender access point device; and
   transmitting the unified network GUI to the client device.

2. The access point device according to claim 1, wherein the unified network GUI is a web page accessible from a web browser on the client device.

3. The access point device according to claim 1, wherein the retrieving of a GUI address comprises retrieving the GUI address from a table of active network devices within the access point device.

4. The access point device according to claim 1, wherein the retrieving of a GUI address comprises retrieving a local IP address of the extender access point device and creating the GUI address using the local IP address.

5. The access point device according to claim 1, wherein the retrieving of a GUI address comprises requesting the GUI address from the extender access point device.

6. The access point device according to claim 1, wherein the operations further comprise sending the GUI of the extender access point device to the client device in response to an activation of the hyperlink.

7. The access point device according to claim 6, wherein the unified GUI provides:
   status information associated with a current operating state of the access point device; and
   input controls to log into and change the configuration of the access point device and a corresponding wireless network of the access point.

8. A method for use with a first access point device, an extender access point device, and a client device, the method comprising:
   receiving, with the first access point device, a configuration request from the client device;
   retrieving, by the first access point device based on the configuration request, a GUI address of the extender access point device;
   adding the GUI address to a unified network GUI as a hyperlink, the unified network GUI being a GUI for the first access point device and the extender access point device; and
   transmitting the unified network GUI to the client device.

9. The method according to claim 8, wherein the unified network GUI is a web page accessible from a web browser on the client device.

10. The method according to claim 8, wherein the retrieving of a GUI address comprises retrieving the GUI address from a table of active network devices within the first access point device.

11. The method according to claim 8, wherein the retrieving of a GUI address comprises retrieving a local IP address for the extender access point device and creating the GUI address using the local IP address.

12. The method according to claim 8, wherein the retrieving of a GUI address comprises requesting the GUI address from the extender access point device.

13. The method according to claim 8, further comprising sending, by the first access point device, the GUI of the extender access point device to the client device in response to an activation of the hyperlink.

14. A non-transitory computer-readable recording medium, use with a first access point device, an extender access point device, and a client device, wherein the first access point device includes a processor, the non-transitory computer-readable medium having stored thereon instructions, which when executed by the processor causes the first access point device to perform operations comprising:
   receiving a configuration request from the client device;
   retrieving, based on the configuration request, a GUI address of the extender access point device;
   adding the GUI address to a unified network GUI as a hyperlink, the unified network GUI being a GUI for the first access point device and the extender access point device; and
   transmitting the unified network GUI to the client device.

15. The computer-readable recording medium according to claim 14, wherein the unified network GUI is a web page accessible from a web browser on the client device.

16. The computer-readable recording medium according to claim 14, wherein the retrieving of a GUI address comprises retrieving the GUI address from a table of active network devices within the first access point device.

17. The computer-readable recording medium according to claim 14, wherein the retrieving of a GUI address comprises retrieving a local IP address for the extender access point device and creating the GUI address using the local IP address.

18. The computer-readable recording medium according to claim 14, wherein the retrieving of a GUI address comprises requesting the GUI address from the extender access point device.

19. The computer-readable recording medium according to claim 15, wherein the operations further comprise sending the GUI of the extender access point device to the client device in response to an activation of the hyperlink.

20. The computer-readable recording medium according to claim 15, wherein the GUI of the extender access point device provides:
    status information associated with a current operating state of the extender access point device; and
    input controls to log into and change the configuration of the second access point device.

* * * * *